US009183955B2

(12) United States Patent
Shin et al.

(10) Patent No.: US 9,183,955 B2
(45) Date of Patent: Nov. 10, 2015

(54) SUSPENSION TYPE HIGH-DENSITY STORAGE RACK FOR NUCLEAR FUEL ASSEMBLIES

(75) Inventors: Se-Yong Shin, Chungcheangbuk-do (KR); Chang-Hwan Hwang, Daejeon (KR); Deuk-Yeon Kim, Daejeon (KR); Jae-Soon Choi, Daejeon (KR); Hung-Soon Chang, Daejeon (KR); Jae-Ho Park, Seoul (KR); Han-Uk Jin, Yongin-si (KR)

(73) Assignees: Korea Nuclear Fuel Co., Ltd., Daejeon (KR); Kones Corporation Co., Ltd., Seoul (KR)

( * ) Notice: Subject to any disclaimer, the term of this patent is extended or adjusted under 35 U.S.C. 154(b) by 525 days.

(21) Appl. No.: 12/646,177

(22) Filed: Dec. 23, 2009

(65) Prior Publication Data
US 2011/0038449 A1 Feb. 17, 2011

(30) Foreign Application Priority Data

Aug. 14, 2009 (KR) .......................... 10-2009-0074952

(51) Int. Cl.
*G21C 19/00* (2006.01)
*G21C 19/07* (2006.01)

(52) U.S. Cl.
CPC ....................................... *G21C 19/07* (2013.01)

(58) Field of Classification Search
CPC ......... G21F 5/005; G21F 5/008; G21F 5/012; G21F 5/12; G21F 5/00; G21F 5/06; G21F 5/08; G21C 19/07
USPC ................ 376/272; 250/506.1, 507.1; 294/89
See application file for complete search history.

(56) References Cited

U.S. PATENT DOCUMENTS

| 2,479,807 | A | * | 8/1949 | Bertea .......................... 403/379.2 |
| 3,720,436 | A | * | 3/1973 | Suvanto et al. ................ 294/205 |
| 3,799,251 | A | * | 3/1974 | Anderson et al. ............... 165/68 |
| 3,882,315 | A | * | 5/1975 | Soldan ......................... 250/506.1 |
| 4,436,693 | A | * | 3/1984 | Zezza et al. ..................... 376/272 |
| 4,652,422 | A | * | 3/1987 | Vogt et al. ...................... 376/272 |
| 4,716,015 | A | * | 12/1987 | Carlson ......................... 376/445 |
| 4,771,526 | A | * | 9/1988 | Arzenti et al. ........... 29/890.031 |

(Continued)

FOREIGN PATENT DOCUMENTS

| JP | 11014785 | 1/1999 |
| KR | 1020050001774 A | 1/2005 |

OTHER PUBLICATIONS

English-language abstract of Korean Patent Laid-Open Publication No. 10-2005-0001774 A.

(Continued)

*Primary Examiner* — Jack W Keith
*Assistant Examiner* — Sharon M Davis
(74) *Attorney, Agent, or Firm* — Rabin & Berdo, P.C.

(57) ABSTRACT

A suspension type high-density storage rack for nuclear fuel assemblies may include a plurality of body parts each having a basket cell storing the corresponding nuclear fuel assembly and having a generally square tube-like shape elongated in a height direction thereof, a plurality of connection plates integrally connecting the basket cells adjacent to each other, while maintaining them at a predetermined distance, and a base plate fixedly coupling the undersides of the basket cells thereto; and a plurality of cap parts each closing the opened upper portion of the corresponding body part and suspending the corresponding nuclear fuel assembly therefrom.

4 Claims, 8 Drawing Sheets

(56) References Cited

U.S. PATENT DOCUMENTS

| | | | |
|---|---|---|---|
| 4,820,472 A * | 4/1989 | Machado et al. | 376/272 |
| 4,863,205 A * | 9/1989 | Schron et al. | 294/82.28 |
| 4,926,046 A * | 5/1990 | Roy et al. | 250/506.1 |
| 5,719,910 A * | 2/1998 | Robert et al. | 376/272 |
| 6,282,254 B1 * | 8/2001 | Burton et al. | 376/262 |
| 2004/0109522 A1 * | 6/2004 | Smith | 376/261 |

OTHER PUBLICATIONS

English-language abstract of Japanese Patent Laid-Open Publication No. 11014785.

* cited by examiner

SUSPENSION TYPE HIGH-DENSITY STORAGE RACK FOR NUCLEAR FUEL ASSEMBLIES

BACKGROUND

1. Field

The present application relates to a high-density storage rack for storing nuclear fuel assemblies before or after using thereinto, and more particularly, to a suspension type high-density storage rack for nuclear fuel assemblies that has each nuclear fuel assembly suspended from a cap part adapted to be coupled to the upper portion of each of a plurality of basket cells, such that the nuclear fuel assemblies are placed correspondingly inside the basket cells, thereby preventing their internal deformation caused by their own weight thereof.

2. Background of the Related Art

Generally, the nuclear fuel assemblies before using in a nuclear power plant are stored in a storage rack, and then, the storage rack is fixed by means of bolts to a storage tank in a fuel building, such that the nuclear fuel assemblies are stored in the air. Contrarily, the nuclear fuel assemblies after using are stored in the storage rack and freely supported in the water into the storage tank in the fuel building.

One example of conventional storage racks is disclosed in Korean Patent Laid-Open Publication No. 10-2005-0001744 entitled 'low-density storage rack for nuclear fuel assemblies in nuclear power plant'.

The above-mentioned prior art suggests a nuclear fuel assembly storage rack adapted to support a square lattice structure made of stainless steel and a poison box to store the nuclear fuel assembly therein by means of a support bar, wherein the welded portion having a length of 4.5 inches between the square lattice-structured cans in the nuclear fuel assembly storage rack is divided into five equally-spaced sections.

According to the above-mentioned prior art, the generation of bad welded portions caused when the square lattice-structured cans are welded to each other is reduced, thereby decreasing the time and personnel cost consumed for the welding. However, it is disadvantageous that the number of nuclear fuel assemblies stored in the storage rack is less than the number of square lattice-structured cans.

To solve the above-mentioned problems, recently, there is provided a storage rack using a neutron absorber to increase a storage capacity for nuclear fuel assemblies. The neutron absorber is made of borated stainless steel, Boraflex, boarl, or the like. The storage rack is called a high-density storage rack, which has the neutron absorber adapted to decrease the distance between the nuclear fuel assemblies for maintaining a subcritical state, thereby increasing the storage capacity of the nuclear fuel assemblies.

One example of the conventional storage racks having the neutron absorber is disclosed in Japanese Patent Laid-Open Publication No. 11(1999)-0014785 entitled 'a storage rack for nuclear fuel assemblies and method for manufacturing the same'.

According to the above-mentioned Japanese prior art, the storage rack for nuclear fuel assemblies has the following advantages: first, the storage rack has a storage capacity for storing a relatively large number of nuclear fuel assemblies in a given volume; second, it is not changed to a critical state; third, it is easy to make it; and fourth, a relatively low manufacturing cost is needed.

The conventional storage rack for the nuclear fuel assemblies has a plurality of housings regularly arranged therein, each housing having a plurality of main plates and a plurality of spacer plates and a base plate, wherein protruding parts formed on two lengthwise edges of the spacer plates are inserted in housing holes of the main plates such that the main plates and the spacer plates are fixed to each other by means of mechanical insertion.

However, since the conventional storage rack stores the nuclear fuel assemblies at a state of being erected on the lower end inside the square tubes, the nuclear fuel assemblies are finely inclined to a predetermined angle in the interior of the square tubes, thereby causing their eccentricity. More particularly, if the nuclear fuel assemblies are stored for a long period of time, they become eccentric to finally cause their internal deformation by their own weight.

On the other hand, if the deformed nuclear fuel assemblies (that is, fresh nuclear fuel) before using are mounted in a nuclear reactor core, unexpected problems will occur.

SUMMARY

Accordingly, the present invention has been made in view of the above-mentioned problems occurring in the prior art, and in one aspect, the present invention may provide a suspension type high-density storage rack for nuclear fuel assemblies that has each nuclear fuel assembly suspended from a cap part in such a manner as to be inserted from the upper portion of each of a plurality of basket cells, such that the nuclear fuel assemblies are placed correspondingly inside the basket cells, thereby preventing their internal deformation caused by their own weight thereof.

In another aspect, the present invention may provide a suspension type high-density storage rack for nuclear fuel assemblies that prevents the nuclear fuel assemblies placed correspondingly inside a plurality of basket cells from being inclined to an arbitrary one side to avoid the internal deformation of the nuclear fuel assemblies caused by their own weight, such that fresh nuclear fuels, that is, nuclear fuel assemblies before using can be stored.

In still another aspect, the present invention may provide a suspension type high-density storage rack for nuclear fuel assemblies that has a cap flange disposed along the upper portion of each of a plurality of basket cells in such a manner as to be coupled to the corresponding cap parts, the cap flange functioning to absorb a primary impact energy generated when impact occurs, thereby preparing the drop impacts caused upon the handling of the nuclear fuel assemblies or upon the generation of artificial or natural disasters.

There may be provided a suspension type high-density storage rack for nuclear fuel assemblies including: a plurality of body parts each having a basket cell storing the corresponding nuclear fuel assembly and having a generally square tube-like shape elongated in a height direction thereof, a plurality of connection plates integrally connecting the basket cells adjacent to each other, while maintaining them at a predetermined distance, and a base plate fixedly coupling the undersides of the basket cells thereto; and a plurality of cap parts each closing the opened upper portion of the corresponding body part and suspending the corresponding nuclear fuel assembly therefrom.

The body part further may include a cap flange coupled to the upper end portion of the basket cell to mount the cap part therealong and adapted to absorb a drop impact generated when a predetermined object drops on the high-density storage rack.

Each of the plurality of cap parts may include: a cap having the corresponding shape to the cap flange and closing the opened upper portion of the corresponding body part; a round rod disposed at the underside of the cap and fixedly suspending the nuclear fuel assembly therefrom; and a crane adapter disposed at the upper side of the cap and connected to handling equipment when the nuclear fuel assembly is lifted.

The suspension type high-density storage rack for nuclear fuel assemblies further may include a plurality of bridge pier parts disposed on the underside of the base plate, each of the bridge pier parts supporting the load applied from the high-density storage rack and the nuclear fuel assemblies stored in the high-density storage rack and adjusting a horizontal level of the storage rack so as to place the storage rack at a horizontal state on a bottom surface of a storage tank to which the storage rack is disposed.

Each bridge pier part may include: a support nut coupled to the underside of the base plate and inserting a support bolt thereinto; the support bolt insertedly fastened to the support nut and adjusting the height to allow the high-density storage rack to be placed at a horizontal level; and a support plate coupled to the underside of the support bolt and distributing the load applied from the support bolt to the bottom surface of the storage tank.

The base plate may have a plurality of drain holes formed on the positions to correspond to the center portions of the basket cells, so as to discharge water generated inside the basket cells to the outside, and the support bolt may have a support bolt drain hole formed along the center portion thereof at the corresponding position to the base plate drain hole, so as to discharge the water downwardly therethrough.

Each of the basket cells may have a plurality of ventilation holes through which air flows.

The connection plates connecting the adjacent basket cells to each other may be disposed alternately to each other.

The support bolt may have a height adjuster disposed along the outer periphery of the lower portion thereof in such a manner as to adjust the height of the support bolt by contacting with a predetermined tool.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION

Figure 1:
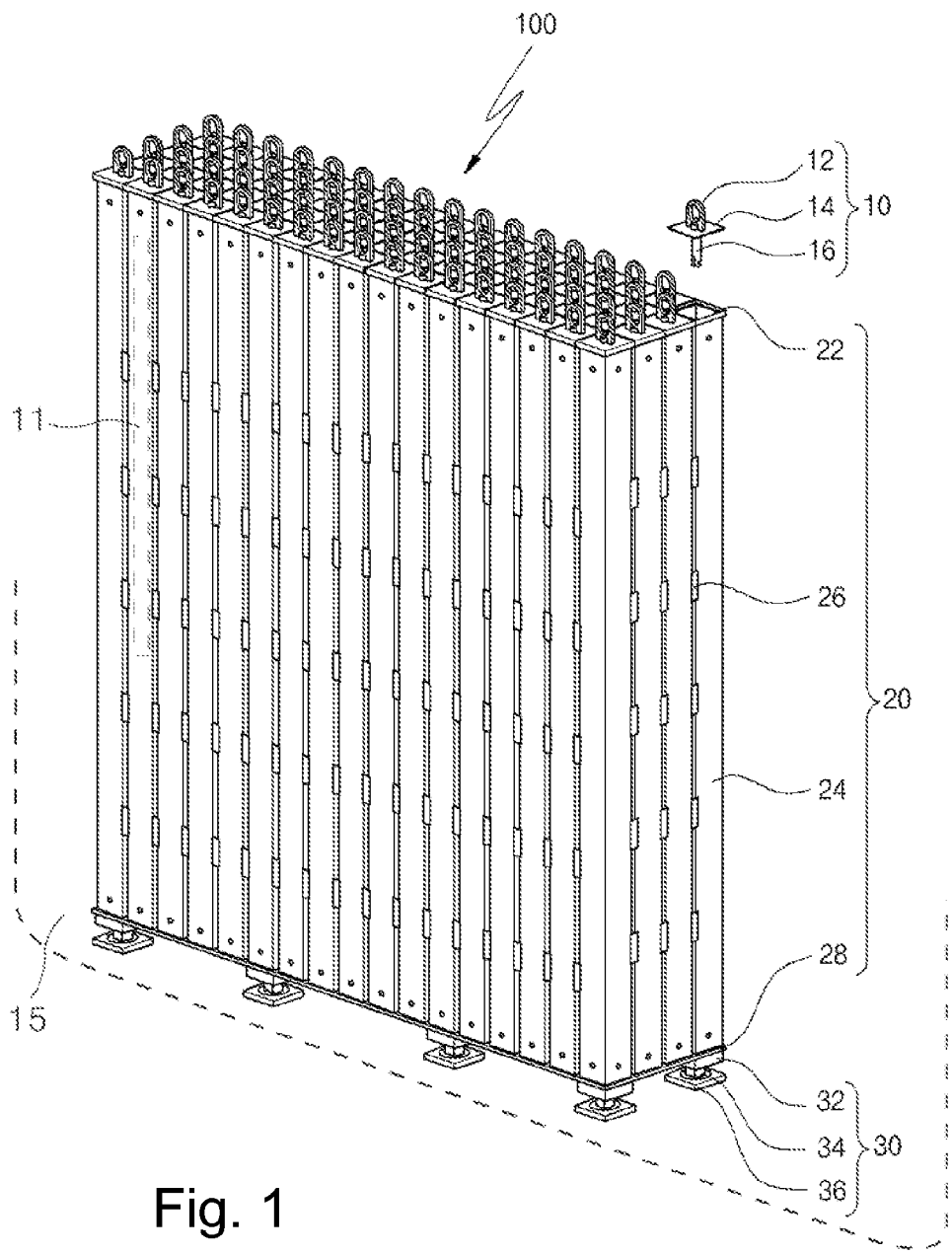
FIG. 1 is a perspective view showing a suspension type high-density storage rack for nuclear fuel assemblies according to the present invention in one embodiment.

Hereinafter, an explanation on a suspension type high-density storage rack for nuclear fuel assemblies according to the present invention in one embodiment will be in detail given with reference to the attached drawings. If there is no specific definition and description, the terms used to indicate upper and lower directions and left and right directions are defined with reference to the attached drawings, and it is noted that the same components and parts as each other are denoted by the same reference numerals in the drawing.

FIG. 1 is a perspective view showing a suspension type high-density storage rack for nuclear fuel assemblies according to the present invention in one embodiment.

The present invention relates to a suspension type high-density storage rack 100 for nuclear fuel assemblies, wherein the nuclear fuel assemblies before or after using are suspended and stored in the storage rack 100. The suspension type high-density storage rack for nuclear fuel assemblies includes: a plurality of body parts 20 each storing the corresponding nuclear fuel assembly (e.g., 11) thereto thereinto; a plurality of cap parts 10 each suspending the corresponding nuclear fuel assembly therefrom and closing the opened upper portion of the corresponding body part 20 thereto, and a plurality of bridge pier parts 30 each adjusting a horizontal level of the storage rack so as to place the storage rack at a horizontal state on a bottom surface of a storage tank (e.g., 15) to which the storage rack is disposed.

The suspension type high-density storage rack 100 for nuclear fuel assemblies according to the present invention in one embodiment has the body parts 20 having an arrangement of 4×17 coupled to a single base plate 28, each of the body parts 20 having the corresponding cap part 10 disposed on the upper portion thereof.

The underside of the base plate 28 is fastened to the plurality of bridge pier parts 30 each adjusting the horizontal level of the storage rack 100 with respect to the bottom surface of the storage tank to which the storage rack 100 is disposed and distributing the load applied from the storage rack 100 and the nuclear fuel assemblies to the bottom surface of the storage tank.

Figure 2:
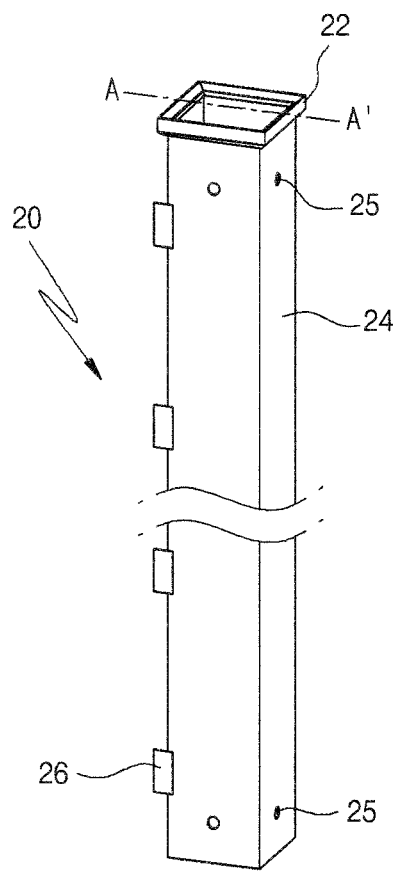
FIG. 2 is a perspective view showing one basket cell of the suspension type high-density storage rack for nuclear fuel assemblies according to the present invention in one embodiment.
Figure 3:
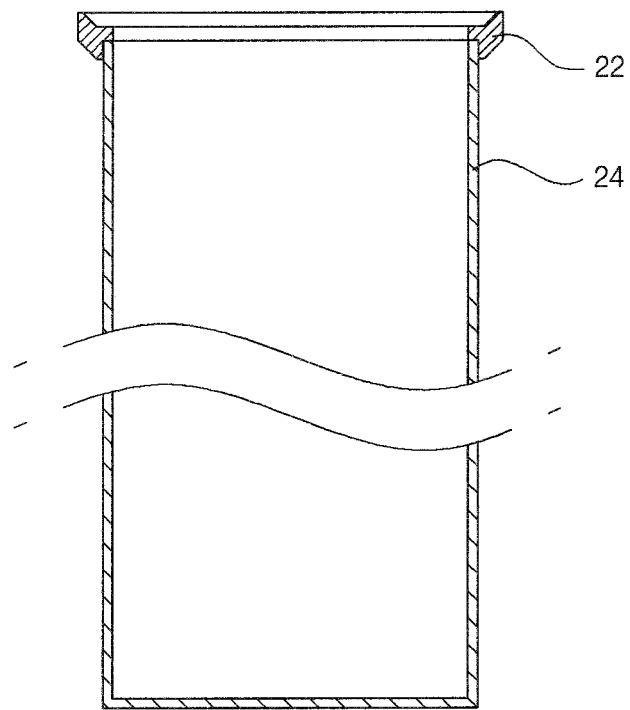
FIG. 3 is a sectional view taken along the line A-A' of FIG. 2.

Referring to FIGS. 2 and 3, each body part 20 is described. FIG. 2 is a perspective view showing one basket cell of the suspension type high-density storage rack for nuclear fuel assemblies according to the present invention in one embodiment, and FIG. 3 is a sectional view taken along the line A-A' of FIG. 2.

The body part 20 includes a basket cell 24, a cap flange 22, and a plurality of connection plates 26.

The basket cell 24 includes a neutron absorber and is made by coupling four vertically elongated rectangular plates to have a square tube-like shape by means of laser welding along the end portions of the vertical sides of the four plates.

Further, a ventilation hole 25 is formed on each of the four rectangular plates of one basket cell 24 near the upper end and lower end portions thereof. Accordingly, the two ventilation holes 25 are formed on the upper and lower portions of each plate. That is, one basket cell 24 has eight ventilation holes 25. The ventilation holes 25 serve to allow air to flow inside and outside the basket cell 24.

The square tube-like basket cell 24 has the cap flange 22 disposed along the four edges thereof.

The cap flange 22 is adapted to allow the cap part 10 from which the nuclear fuel assembly is suspended to be stably mounted therealong.

The cap flange 22 has a generally square section in such a manner as to be fixedly coupled to the basket cell 24. The inner surface of the lower portion of the cap flange 22 abuts against the outer surface of the upper portion of the basket cell 24, and the upper portion thereof is formed to correspond to the shape of a cap 14 (see FIG. 1) in such a manner as to mount the cap 14 therealong.

The cap flange 22 is coupled along the upper portion of the basket cell 24 by means of intermittent welding.

When the nuclear fuel assembly is housed or lifted up, and alternatively, if the nuclear fuel assembly or handling equipment is dropped by artificial causes or natural disasters and thus collies with the basket cell 24, the cap flange 22 functions to primarily absorb impact energy generated at that time.

Figure 4:
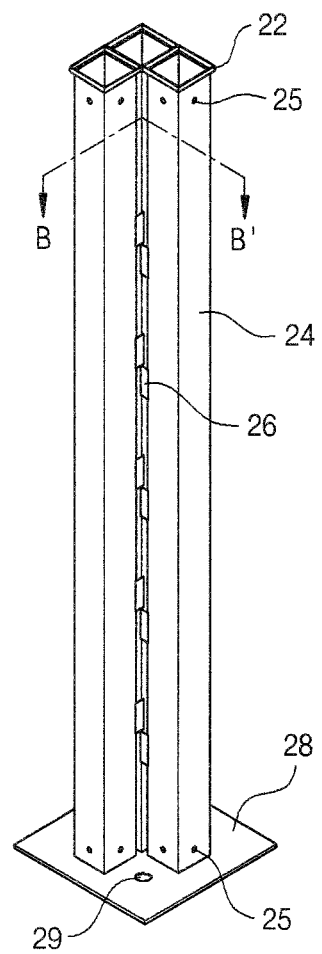
FIG. 4 is a perspective view showing the coupled state among the adjacent basket cells.
Figure 5:
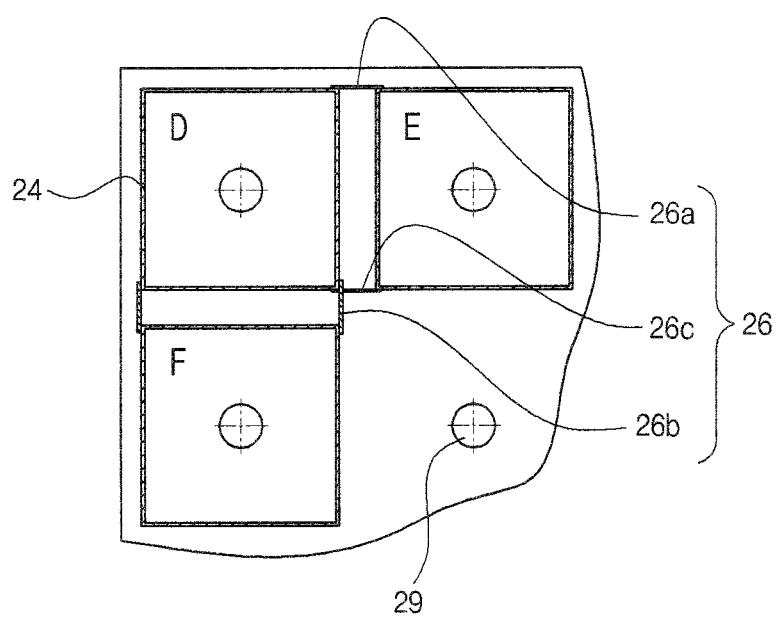
FIG. 5 is a top view showing the coupled state among the basket cells taken along the line B-B' of FIG. 4.

Referring to FIGS. 4 and 5, the connection between the basket cells 24 adjacent to each other and the coupling between the connected basket cells 24 and the base plate 28 are explained.

FIG. 4 is a perspective view showing the coupled state among the adjacent basket cells, and FIG. 5 is a top view showing the coupled state among the basket cells taken along the line B-B' of FIG. 4.

An explanation on the connection between the basket cells 24 adjacent to each other will be first given. FIG. 4 shows a part of the suspension type high-density storage rack 100 for nuclear fuel assemblies, wherein three basket cells 24 are connected to each other by means of a plurality of connection plates 26.

The connection plates 26 serve to connect the basket cell 24 to the adjacent basket cell 24 thereto, thereby forming the basket cells 24 having an arrangement of 4×17 as an integral body with each other.

The connection plates 26 are provided along the direction of the height of the basket cells 24, and each connection plate 26 has a predetermined width such that the edge of one basket cell 24 is connected to the edge of the adjacent basket cell 24 thereto, while being spaced apart therefrom by a predetermined distance. Also, each connection plate 26 has a predetermined length such that five or five pairs of connection plates 26 are coupled along the direction of the height of the basket cell 24, while being spaced apart from each other by a predetermined distance.

If the outermost basket cells 24 among the basket cells 24 having an arrangement of 4×17 are connected to each other, the face exposed to the outside of one outermost basket cell 24 is welding-connected to the face exposed to the outside of the adjacent outermost basket cell 24 thereto by means of five connection plates 26a (see FIG. 5).

On the other hand, if the faces not exposed to the outside of the outermost basket cells 24 are connected to each other, if the outermost basket cells 24 are connected to the inside basket cells 24, or if the inside basket cells 24 are connected to each other, the five pairs of connection plates 26 are alternately disposed and welded to connect them, as shown in FIG. 4.

FIG. 5 is a top view showing the coupled state among the basket cells 24 taken along the line B-B' of FIG. 4.

If the D basket cell 24 is connected to the adjacent E and F basket cells 24, the faces exposed to the outside of the basket cells 24 are coupled by means of the five connection plates 26a as shown in FIG. 1. However, if the faces not exposed to the outside of the basket cells 24 are connected to each other, the D basket cell 24 and the F basket cell 24 are coupled by means of five connection plates 26b and the D basket cell 24 and the E basket cell 24 by means of five connection plates 26c. The connection plates 26c connecting the D basket cell 24 and the E basket cell 24 are disposed just below the connection plates 26b connecting the D basket cell 24 and the F basket cell 24, such that the connection plates 26b and 26c are disposed alternately to each other.

The basket cells 24 are fixed to the base plate 28 supporting the load applied from the basket cells 24 and the nuclear fuel assemblies stored inside the basket cells 24.

The base plate 28 serves to fix the basket cells 24 thereto and has a plurality of drain holes 29 formed on the positions to correspond to the center portions of the basket cells 24, so as to discharge water generated inside the basket cells 24 to the outside.

Figure 6:
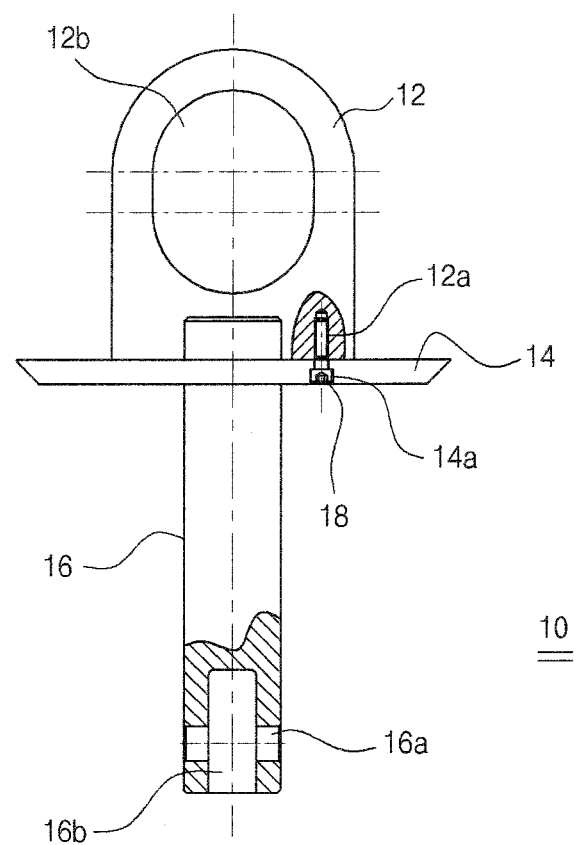
FIG. 6 is a sectional view showing one cap part of the suspension type high-density storage rack for nuclear fuel assemblies according to the present invention in one embodiment.

FIG. 6 is a sectional view showing one cap part of the suspension type high-density storage rack for nuclear fuel assemblies according to the present invention in one embodiment.

The cap part 10 serves to suspend the nuclear fuel assembly therefrom and to close the opened upper portion of the corresponding body part 20 after the nuclear fuel assembly has been housed in the body part 20.

The cap part 10 includes a crane adapter 12, a cap 14, and a round rod 16.

The cap 14 has the corresponding shape to the cap flange 22 and closes the opened upper portion of the body part 20 when coupled to the cap flange 22. Further, the whole area of the cap 14 is designed larger than the sectional area of the cap flange 22 or the basket cell 24. This prevents the cap 14 from being dropped to the inside of the basket cell 24 when the nuclear fuel assembly suspending from the cap 14 is stored or is lifted therefrom.

The round rod 16 is disposed at the underside of the cap 14 for fixedly suspending the nuclear fuel assembly to be stored inside the basket cell 24, and the crane adapter 12 is disposed at the upper side of the cap 14 for being connected to a lifting crane for lifting the nuclear fuel assembly.

The round rod 16 and the crane adapter 12 are coupled to each other by means of welding, and the cap 14 and the crane adapter 12 by means of fixing means like a bolt 18 or by means of welding.

The crane adapter 12 has a hook-like shape and a crane connection hole 12b formed on the center portion thereof in such a manner as to be connected to the crane when the nuclear fuel assembly is stored or lifted.

So as to couple the crane adapter 12 and the cap 14, the cap 14 has a through hole 14a formed thereon such that the head of the bolt 18 is disposed on the cap 14 and the body of the bolt 18 is passed therethrough. The crane adapter 12 has a fixing groove 12a formed at the corresponding position to the through hole 14a of the cap 14, thereby insertedly fixing the bolt 18 thereto.

The round rod 16 is coupled at the upper portion thereto to the crane adapter 12 by means of welding and has a lifting hook formed at the lower portion thereto for suspending the nuclear fuel assembly therefrom.

The round rod 16 has a lifting hook insertion hole 16b formed at the lower portion thereof for fixing the lifting hook thereto and a lifting hook fixing pin hole 16a adapted to insert a lifting hook fixing pin (not shown) for fixing the lifting hook inserted into the lifting hook insertion hole 16b thereto thereinto.

Figure 7:
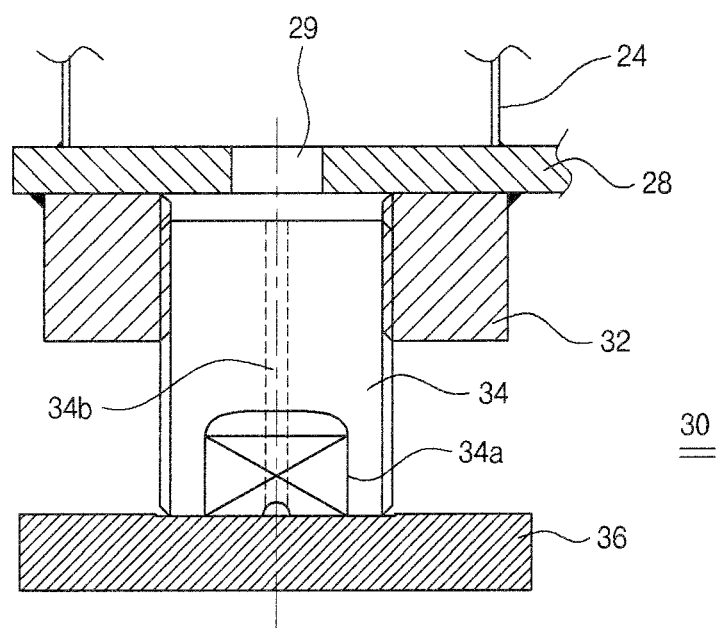
FIG. 7 is a sectional view showing one bridge pier part supporting the suspension type high-density storage rack for nuclear fuel assemblies according to the present invention in one embodiment.

FIG. 7 is a sectional view showing one bridge pier part supporting the suspension type high-density storage rack for nuclear fuel assemblies according to the present invention in one embodiment.

A plurality of bridge pier parts 30 is coupled on the underside of the base plate 28 so as to place the high-density storage rack 100 and the nuclear fuel assemblies stored therein on the bottom surface of the storage tank at a horizontal level.

The number of bridge pier parts 30 is determined appropriately to support the entire weight of the cap parts 10, the body parts 20 and the nuclear fuel assemblies stored inside the body parts 20, and in one embodiment of the present invention, desirably, eight bridge pier parts 30 are provided.

The bridge pier part 30 includes a support nut 32, a support bolt 34, and a support plate 36.

The support nut 32 is coupled to the underside of the base plate 28 by means of welding, and the support bolt 34 is inserted into the center portion of the support nut 32.

The support bolt 34 is fastened to the support nut 32 and is adjusted in height in accordance with the state of the bottom surface of the storage tank on which the high-density storage rack 100 is placed, thereby allowing the high-density storage rack 100 to be always maintained at the horizontal level.

The support bolt 34 further includes a height adjuster 34a formed at a portion of the outer periphery of the lower end thereof so as to adjust the height of the support bolt 34. The height adjuster 34a has a cut section formed by cutting a portion of the outer periphery of the lower end of the support bolt 34 having a round section. In one embodiment of the present invention, the cut section is formed at the both side outer peripheral surfaces of the support bolt 34 in such a manner as to face each other, while being distant from each other at 180 degrees. A tool comes into contact with the height adjuster 34a for turning the support bolt 34, thereby adjusting the height of the support bolt 34.

The support bolt 34 has a support bolt drain hole 34b formed along the center portion thereof at the corresponding position to the base plate drain hole 29 of the base plate 28, such that the water generated inside the basket cell 24 is passed through the base plate drain hole 29 and is discharged downwardly through the support bolt drain hole 34b.

The support plate 36 is coupled at the upper side thereto to the underside of the support bolt 34. The support plate 36 serves to distribute the load applied from the support bolt 34 to the bottom surface of the storage tank.

The support plate 36 has predetermined thickness and width enough to prevent the load applied from the high-density storage rack 100 and the nuclear fuel assemblies stored therein from damaging the bottom surface of the storage tank.

Figure 8:
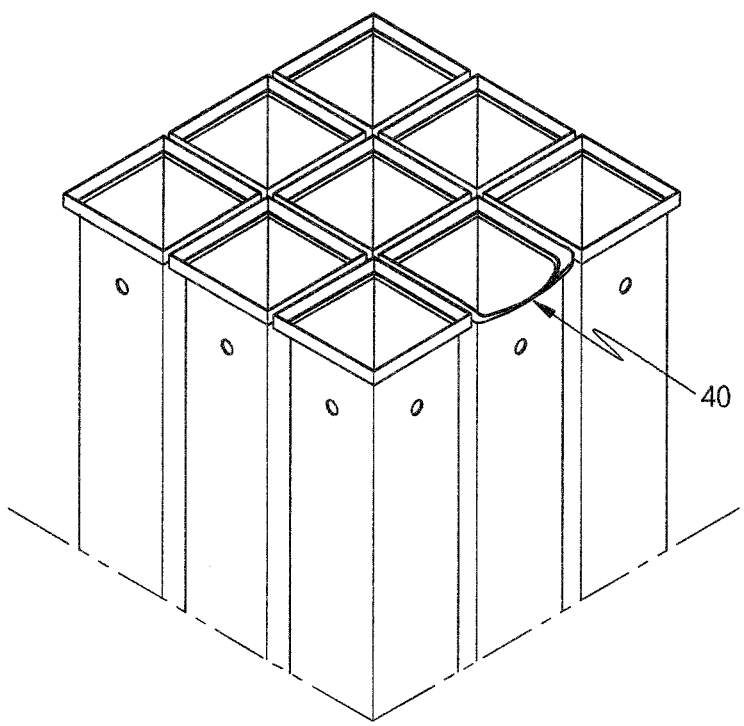
FIG. 8 is a simulation view showing the degrees of deformation of the cap flanges when the nuclear fuel assemblies are dropped from the upper portion of the suspension type high-density storage rack for nuclear fuel assemblies according to the present invention in one embodiment.

FIG. 8 is a simulation view showing the degrees of deformation of the cap flanges when the nuclear fuel assemblies are dropped from the upper portion of the suspension type high-density storage rack for nuclear fuel assemblies according to the present invention in one embodiment.

As shown, when the nuclear fuel assemblies are dropped from the upper portion (0.815 m) of the high-density storage rack 100, that is, after 0.0117 seconds, the cap flange 22 is bent outwardly to form a bending portion 40.

Since the high-density storage rack 100 has the cap flanges 22 disposed on the upper portions of the basket cells 24, the impact generated when the nuclear fuel assemblies or handling equipment collide with the basket cells 24 is primarily absorbed.

Upon the generation of the collision, as shown in FIG. 8, the cap flange 22 is bent outwardly through the lower welded portion thereof coupled to the basket cells 24.

When the nuclear fuel assembly is dropped, the cap flange 22 absorbs the generated impact with the formation of the bending portion 40, such that the area on which plastic deformation occurs is defined only on the upper portion of the basket cell 24 and is not applied to the lower portion of the basket cell 24 on which the nuclear fuel assembly is placed.

As described above, there is provided the suspension type high-density storage rack for nuclear fuel assemblies that has each nuclear fuel assembly suspended from the cap part adapted to be coupled to the upper portion of the corresponding basket cell thereto, such that the nuclear fuel assemblies are placed inside the corresponding basket cells, thereby preventing their internal deformation caused by their own weight.

Additionally, according to the present invention in one embodiment, the nuclear fuel assemblies are not mounted and stored on the lower ends of the internal portions of the basket cells, but they are suspended correspondingly from the cap parts and fixedly stored thereinto, such that the nuclear fuel assemblies are placed on the centers of the internal portions of the corresponding basket cells, thereby preventing their inclination to arbitrary one sides inside the basket cells.

Additionally, according to the present invention in one embodiment, the above-mentioned effects can be obtained when the nuclear fuel assemblies after using are stored, and in the same manner as mentioned above, since they are placed on the center inside the basket cells, without any inclination, while avoiding their internal deformation caused by their own weight, the nuclear fuel assemblies before using can be also stored.

Furthermore, according to the present invention in one embodiment, the suspension type high-density storage rack has the cap flange disposed along the upper portion of each basket cell in such a manner as to be coupled to the cap part, the cap flange functioning to absorb primary impact energy generated when the nuclear fuel assembly collides with the basket cell during the storing or lifting of the nuclear fuel assembly to and from the storage rack or upon the generation of the drop accidents by natural disasters like earthquakes.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A high-density storage rack for nuclear fuel assemblies comprising:
   a plurality of body parts each having
      a basket cell configured to store a corresponding nuclear fuel assembly and having a generally square tube shape elongated in a height direction thereof, and
      a plurality of connection plates integrally connecting basket cells adjacent to each other and maintaining a predetermined distance therebetween;
   a base plate fixedly coupling an underside of each of the basket cells thereto and having a plurality of drain holes, each of the drain holes being formed in a circular shape at a position corresponding to a center portion of the basket cell;
   a plurality of cap parts each closing an upper end of a corresponding one of the plurality of body parts, wherein each of the plurality of cap parts comprises
      a cap being a flat shape and closing an upper end of the basket cell,
      a crane adapter fixed to an upper surface of the cap,
      a round rod disposed at an underside of said cap, being a cylindrical shape as a whole and extending downwards from the cap, an upper end portion of the round rod passing through a center portion of the cap and being fixed directly to the crane adapter and a lower portion of the round rod suspending the nuclear fuel assembly therefrom, the round rod including
a lifting hook insertion hole formed at the lower portion of the round rod along a central axis of the round rod and having a circular shape closed in all directions by the round rod when taken from a bottom view,
a lifting hook fixing pin hole passing straight through the lower portion of the round rod in a perpendicular direction to the central axis of the round rod and forming a cross-shape in combination with the lifting hook insertion hole, and
a lifting hook suspending the nuclear fuel assembly therefrom, the lifting hook being inserted into the lifting hook insertion hole;
a fixing groove formed in a bottom surface of the crane adapter in a vertical direction to the cap, and
a bolt inserted into the fixing groove through the cap in the vertical direction to fix the crane adapter to the cap, wherein the bolt is disposed outside the center portion of the cap through which the round rod passes;
a plurality of cap flanges each fixedly coupled to an upper end portion of the basket cell, wherein a lower part of each of the cap flanges surrounds an outer surface of the upper end portion of the basket cell along four edges of the basket cell, a middle part of said each of the cap flanges protrudes inwardly and directly contacts the top surface of the basket cell and a lower surface of the cap therebetween for preventing the cap from coming into contact with the top surface of the basket cell, thereby absorbing impact energy between the cap and the basket cell, and an upper part of said each of the cap flanges is formed to correspond to a shape of the cap for securely mounting the cap thereon in such a manner that an inner surface of the upper part of each of the cap flanges surrounds edges of the cap; and
a plurality of bridge pier parts disposed on an underside of the base plate, each of the bridge pier parts supporting the load applied from the high-density storage rack and the nuclear fuel assemblies, when the nuclear fuel assemblies are stored in the high-density storage rack, and adjusting a horizontal level of the storage rack so as to place the storage rack at a horizontal state on a bottom surface of a storage tank when the storage rack is disposed in the storage tank, said each of the bridge pier parts including
a support nut coupled to the underside of the base plate and having a threaded hole thereinside such that the threaded hole directly communicates with an inside of the basket cell through corresponding one of the drain holes,
a support bolt insertedly fastened to the threaded hole of the support nut and adjusting the height to allow the high-density storage rack to be placed at a horizontal level, the support bolt having a support bolt drain hole formed along a center axis of the support bolt, the support bolt drain hole being open to both sides of the support bolt, and
a support plate coupled to the underside of the support bolt and distributing the load applied from the support bolt to the bottom surface of the storage tank,
wherein the support bolt drain hole shares the center axis thereof with said corresponding one of the drain holes of the base plate and remains open to the both sides of the support hole at all times so as to discharge water generated in the basket cell to the outside through said corresponding one of the drain holes of the base plate and the support bolt drain hole.

2. The high-density storage rack for nuclear fuel assemblies according to claim 1, wherein each of the basket cells has a plurality of ventilation holes at upper portion and lower portion of basket cells, through which air flows inside and outside the basket cells.

3. The high-density storage rack for nuclear fuel assemblies according to claim 2, wherein the connection plates connecting the adjacent basket cells to each other are disposed alternately to each other.

4. The high-density storage rack for nuclear fuel assemblies according to claim 3, wherein the support bolt has a height adjuster disposed along the outer periphery of the lower portion thereof in such a manner as to adjust the height of the support bolt by contacting with a predetermined tool.

* * * * *